US007489602B2

(12) United States Patent
Chung

(10) Patent No.: US 7,489,602 B2

(45) Date of Patent: Feb. 10, 2009

(54) APPARATUS AND METHOD FOR LAYER JUMP BRAKING CONTROL IN AN OPTICAL DRIVE

(75) Inventor: Chiang Shih Chung, Kaohsiung (TW)

(73) Assignee: Realtek Semiconductor Corp. (TW)

( * ) Notice: Subject to any disclaimer, the term of this patent is extended or adjusted under 35 U.S.C. 154(b) by 525 days.

(21) Appl. No.: 11/134,167

(22) Filed: May 20, 2005

(65) Prior Publication Data

US 2005/0259529 A1 Nov. 24, 2005

(30) Foreign Application Priority Data

May 21, 2004 (TW) .............................. 93114335 A

(51) Int. Cl.
*G11B 7/00* (2006.01)

(52) U.S. Cl. ................................ 369/44.25; 369/44.26

(58) Field of Classification Search .............. 369/44.25, 369/44.26, 44.35, 44.27, 44.28, 44.29, 94, 369/44.34

See application file for complete search history.

(56) References Cited

U.S. PATENT DOCUMENTS

| | | | | |
|---|---|---|---|---|
| 6,775,209 | B2 * | 8/2004 | Kobayashi | 369/44.29 |
| 6,801,485 | B2 * | 10/2004 | Chiang | 369/44.29 |
| 7,009,917 | B2 * | 3/2006 | Chiang et al. | 369/44.27 |
| 7,184,374 | B2 * | 2/2007 | Chung et al. | 369/44.27 |

FOREIGN PATENT DOCUMENTS

| | | |
|---|---|---|
| CN | 1416122 A | 5/2003 |

* cited by examiner

*Primary Examiner*—Nabil Z Hindi

(57) ABSTRACT

An apparatus and method for layer jump braking control is disclosed. The apparatus is applied to an optical drive and generates a non-fixed braking signal according to a focusing error signal. The non-fixed braking signal is provided to a driver for outputting a corresponding driving force, thereby controlling a pick up head of the optical drive to perform a layer jump braking process. By using the non-fixed braking signal, the disadvantage of the conventional fixed braking signal, which cannot adapt to variations of optical disks and is subject to layer jump failure, can be avoided.

21 Claims, 6 Drawing Sheets

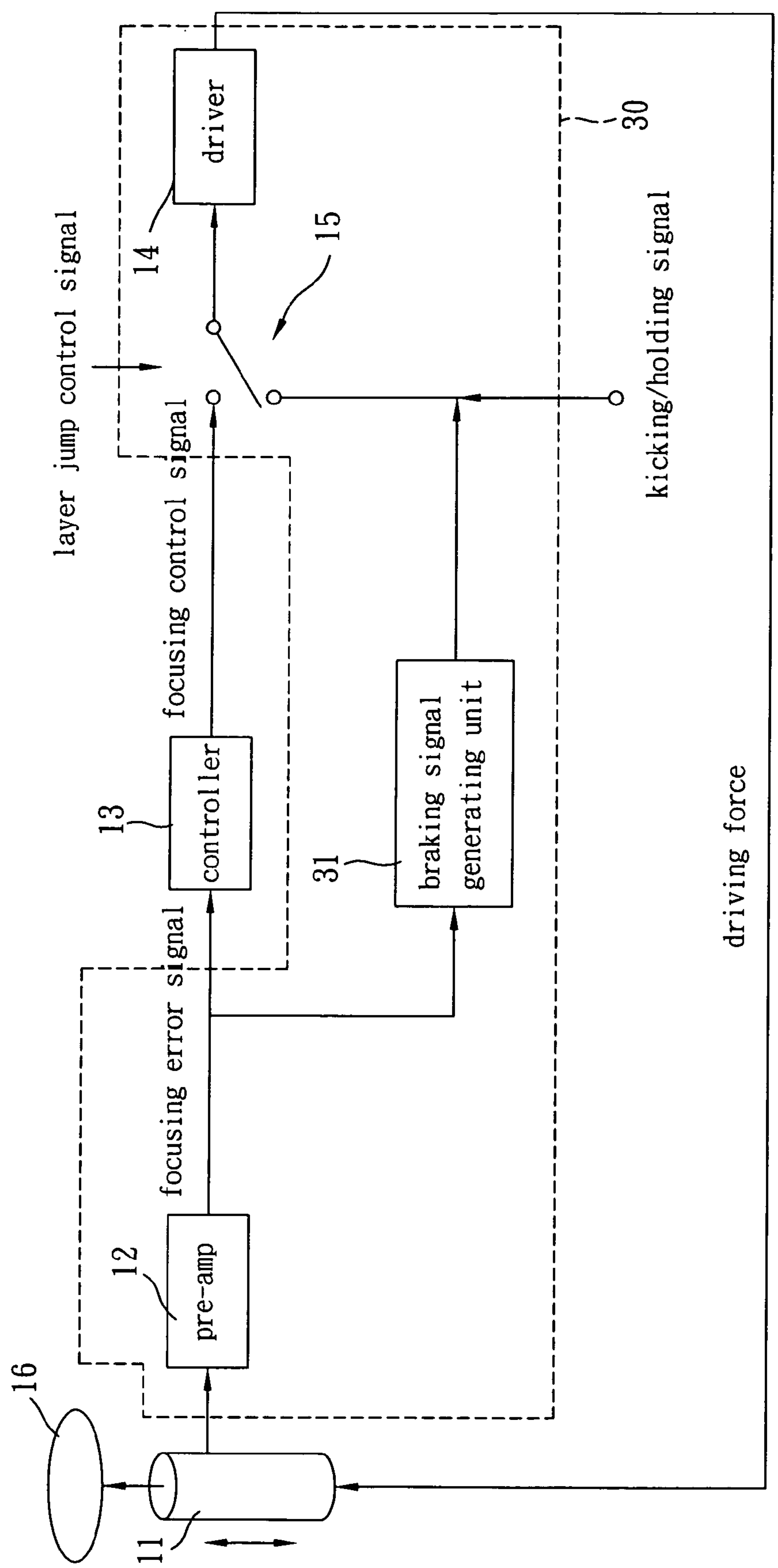
F I G. 3

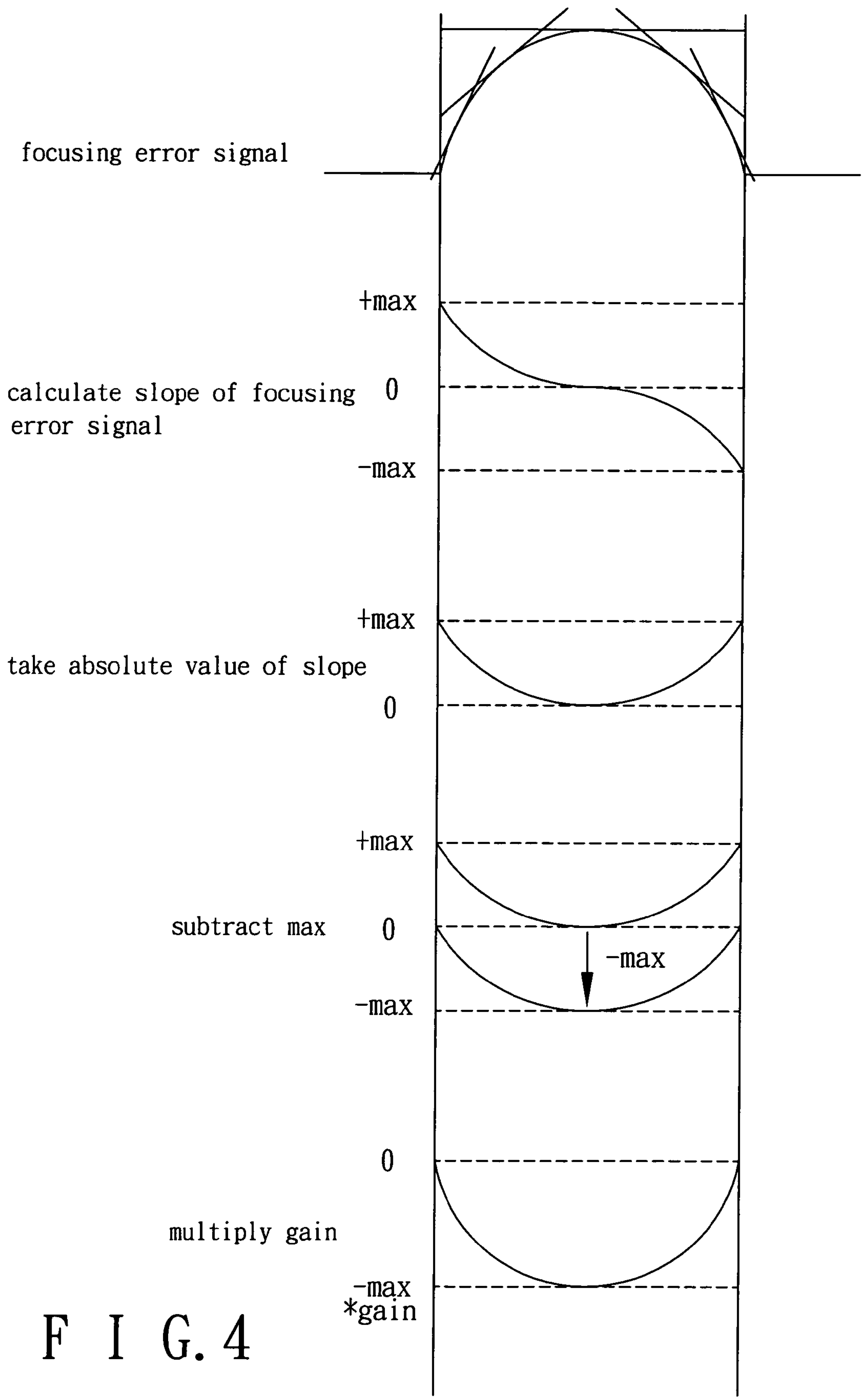
F I G. 4

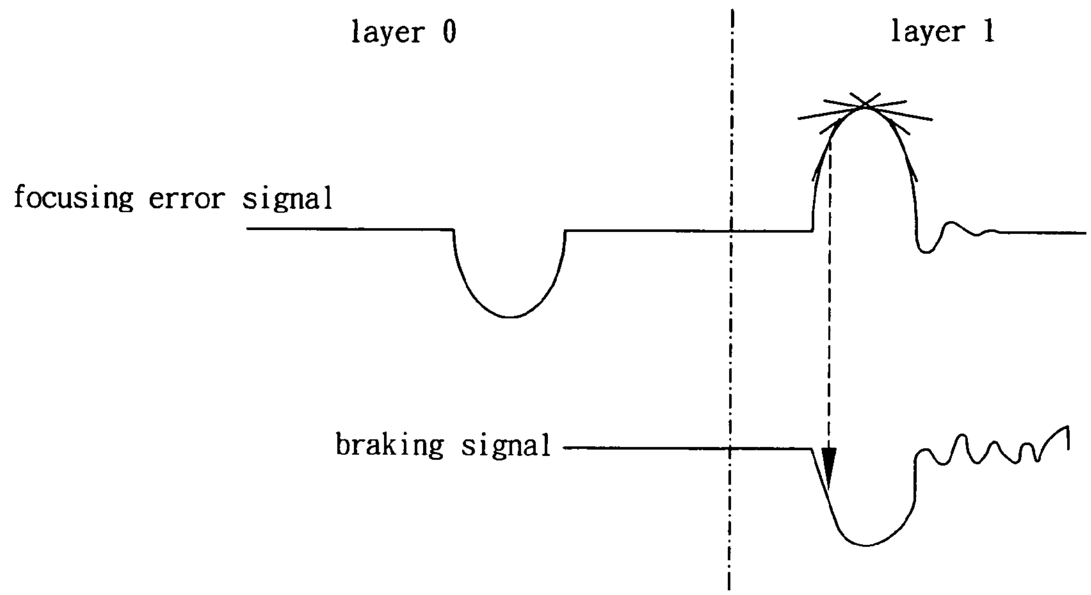
F I G. 5A
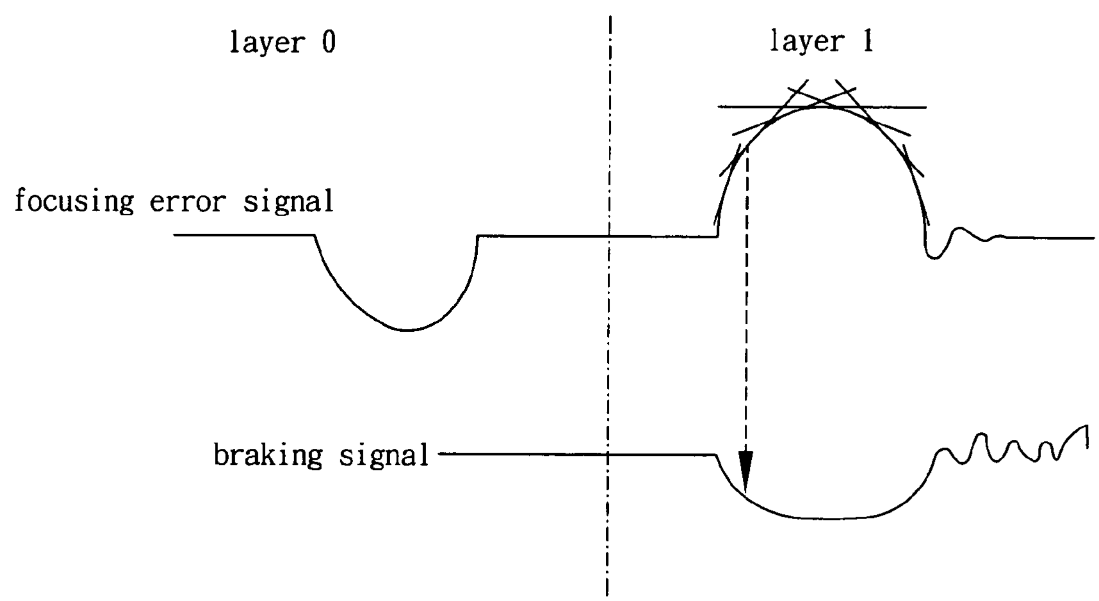
F I G. 5B

APPARATUS AND METHOD FOR LAYER JUMP BRAKING CONTROL IN AN OPTICAL DRIVE

BACKGROUND OF INVENTION

1. Field of the Invention

The present invention relates in general to the field of optical storage, and more particularly to an apparatus and method for layer jump braking control in an optical drive.

2. Description of the Prior Art

Optical disks are popular storage media nowadays. The data capacity of an optical disk depends on layer properties and the number of layers (single or dual layer). When an optical drive reads a dual layer disk, the optical drive performs a layer jump process, that is, the pick up head of the optical drive moves its laser spot between two layers of the disk. In this specification, these two layers are called layer 0 and layer 1 respectively.

FIG. 1 is an architectural diagram of a conventional optical drive with layer jump control. The conventional optical drive includes a pick up head 11, a pre-amp 12, a controller 13, a driver 14, and a switch 15, as shown in FIG. 1. The switch 15 is used for controlling whether to perform the layer jump process according to a layer jump control signal.

FIG. 2 is a diagram showing how to perform layer jump control according to the architecture of FIG. 1. Before the layer jump process is performed (i.e. a layer jump control signal has not been received yet), the driver 14 receives the focusing control signal from the controller 13 and generates the driving force according to the focusing control signal such that the laser spot of the pick up head 11 is kept at the original layer (layer 0 in FIG. 2). In this way, closed-loop focusing control is achieved. Since the layer distance of the disk 16 is not uniform and a wobble effect may occur, the focusing control signal varies correspondingly, as shown in FIG. 2.

When receiving the layer jump control signal, the switch 15 is turned to the lower node of FIG. 1, and the layer jump process is then performed. As shown in FIG. 2, the driver 14 receives a kicking signal, a holding signal, and a braking signal in turn so as to make the pick up head 11 to correspondingly perform a kicking process, a holding process, and a braking process. The kicking process moves the laser spot away from the original layer and toward the target layer (layer 1 in FIG. 2). The holding process keeps the pick up head 11 moving toward the target layer continually after the laser spot completely escapes the original layer. When the laser spot approaches the focusing linear region of the target layer, the braking process slows down the pick up head 11 to prevent the laser spot from exceeding the linear region, thereby avoiding layer jump failure. When the braking process is finished, the whole layer jump process is also finished, and the switch 15 is shifted back to the upper node to return to the original closed-loop focusing control. The braking signal of the conventional optical drives is constant, that is, the braking control force outputted from the driver 14 is fixed when the layer jump process is performed.

However, a problem exists in this implementation. Since the layer distance of a dual layer disk may not be uniform, and the disk may wobble when accessed by the disk drive, the layer jump location and speed would not be all the same. If a fixed braking control force is applied, it is very possible that the laser spot exceeds the focusing linear region of the target layer to cause the layer jump failure. In consideration of different optical disks, the variation is still larger, and layer jump failure is even more likely to occur.

The other prior arts are disclosed. For example, U.S. Pub. No. 20030112720 titled "Method of layer jump braking control for an optical drive" and U.S. Pub. No. 20030076755 titled "Layer jump control for an optical drive".

SUMMARY OF INVENTION

It is therefore one of the objectives of the present invention to provide an apparatus and method for layer jump braking control in an optical drive. The apparatus and method can provide a non-fixed braking control force to prevent layer jump failure.

Another one of the objectives of the invention is to provide an apparatus and method for layer jump braking control in an optical drive. The apparatus and method can be dynamically adjusted according to disk variation, thereby stabilizing the operation of the optical drive.

According to the embodiment of the present invention, a method for controlling a layer jump process of an optical drive is provided. The optical drive includes a pick up head which performs the layer jump process on an optical disk with at least two layers. The method comprises: generating a non-fixed braking signal according to a focusing error signal; and controlling the pick up head to perform a layer jump braking process according to the braking signal.

According to the embodiment of the present invention, an apparatus for controlling a layer jump process of an optical drive is provided. The optical drive includes a pick up head which performs a layer jump process on an optical disk with at least two layers. The apparatus comprises: an amplifier, coupled to the pick up head, for generating a focusing error signal; a braking signal generating unit, coupled to the amplifier, for generating a non-fixed braking signal according to the focusing error signal; and a driver, coupled to the braking signal generating unit and the pick up head, for controlling the pick up head to perform a layer jump braking process according to the braking signal.

According to the embodiment of the present invention, an optical drive for performing a layer jump braking process is provided. The optical drive comprises: a pick up head, for performing a layer jump process on an optical disk with at least two layers; an amplifier, coupled to the pick up head, for generating a focusing error signal; a braking signal generating unit, coupled to the amplifier, for generating a non-fixed braking signal according to the focusing error signal; and a driver, coupled to the braking signal generating unit and the pick up head, for controlling the pick up head to perform the layer jump braking process according to the braking signal.

BRIEF DESCRIPTION OF THE DRAWINGS

FIG. 3 is a block diagram of a preferred embodiment of the apparatus for layer jump braking control according to the present invention.

FIG. 4 is a diagram showing the generation process of the braking voltage.

FIG. 5A and FIG. 5B are diagrams showing the relation between the focusing error signal and the generated braking signal at different layer jump speeds in the embodiment of FIG. 4.

DETAILED DESCRIPTION

Figure 1:
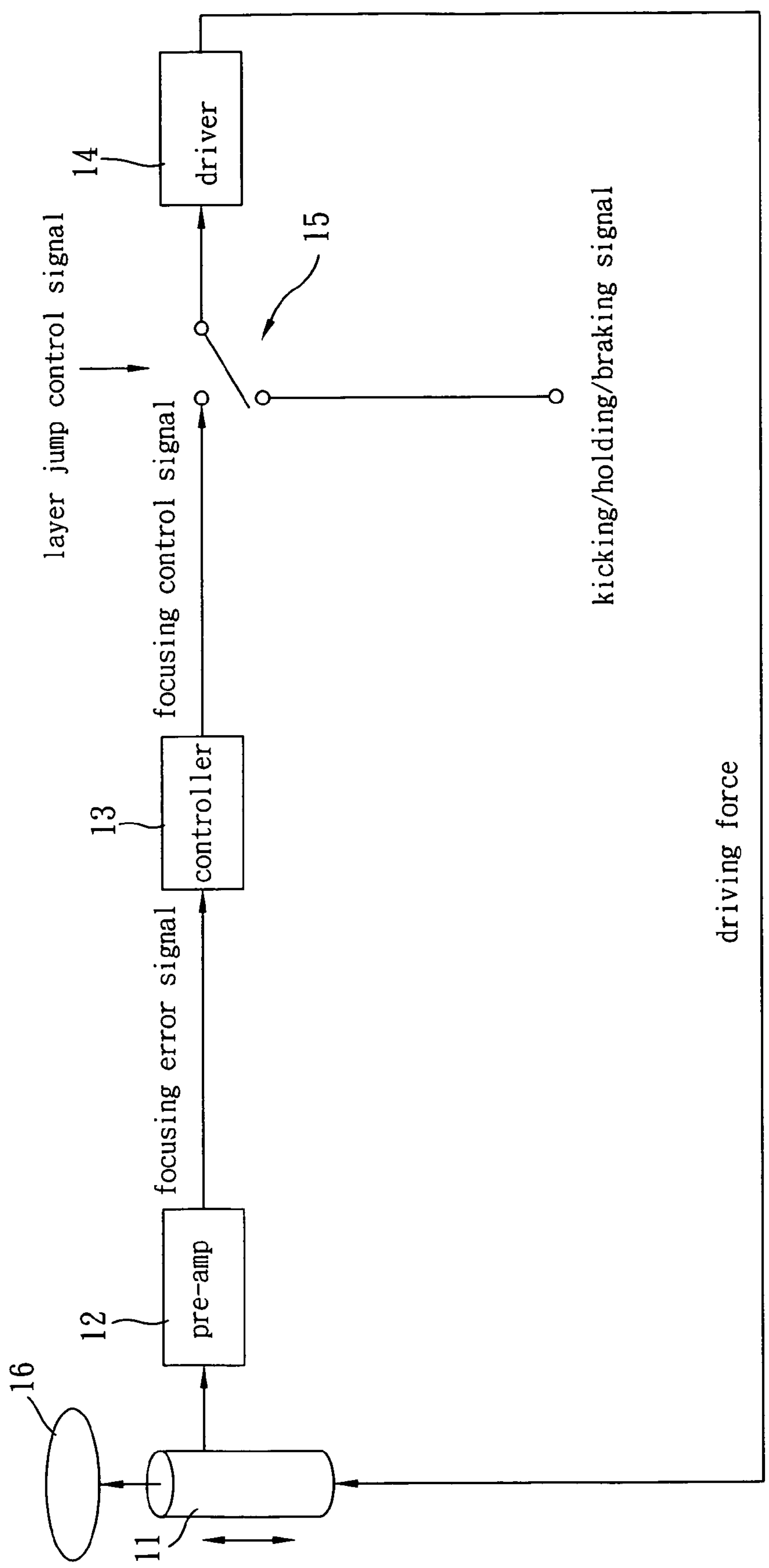
FIG. 1 is an architectural diagram of a conventional optical drive with layer jump control.
Figure 2:
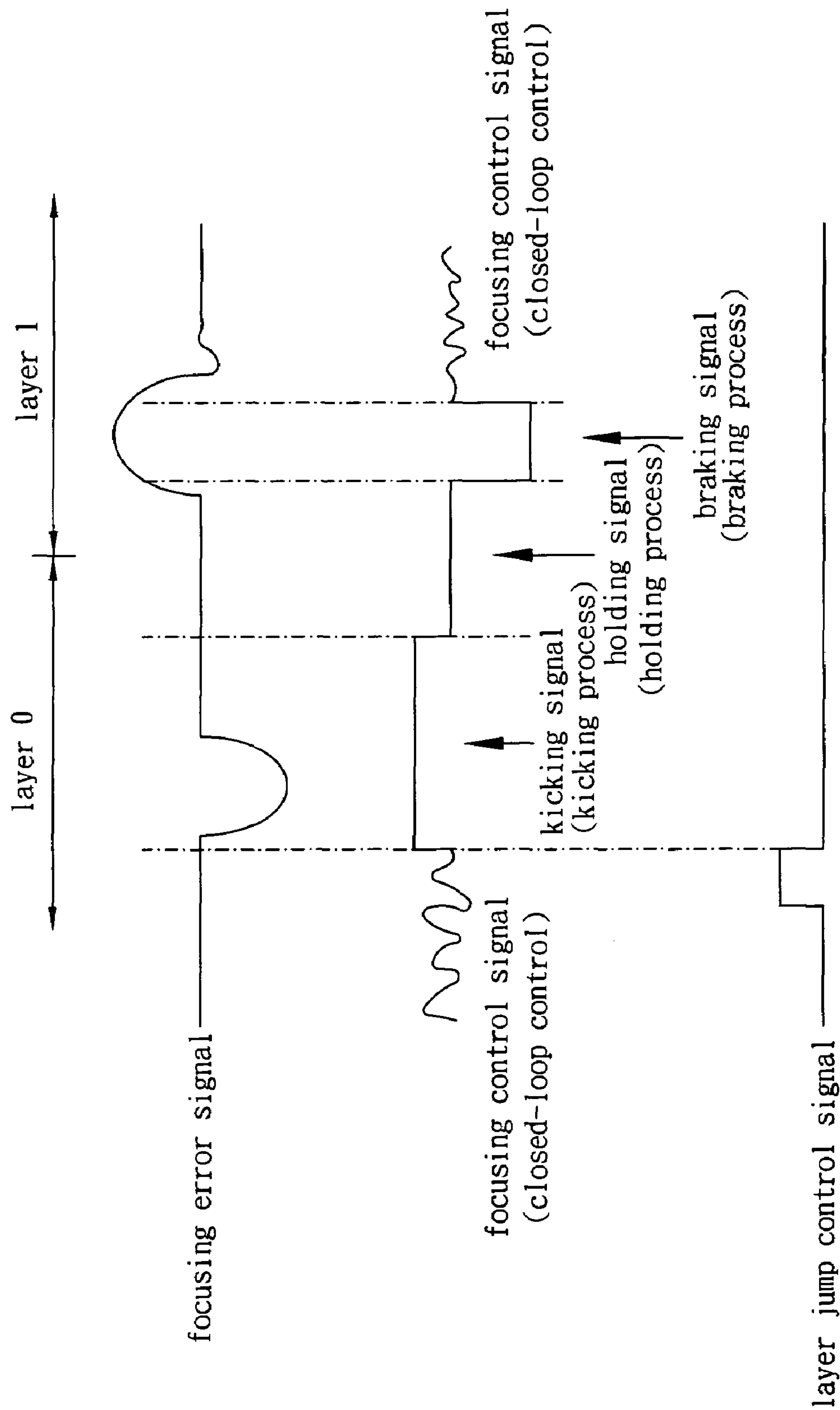
FIG. 2 is a diagram showing how to perform layer jump control according to the architecture of FIG. 1.

FIG. 3 is a block diagram of a preferred embodiment of the apparatus for layer jump braking control according to the present invention. In FIG. 3, the apparatus 30 is set in an optical disk drive, e.g. DVD drive. The optical disk drive includes a pick up head 11, which moves vertically against a disk 16 (e.g. DVD disk) with at least two layers to perform a layer jump process that includes a layer jump braking process. The apparatus 30 includes a pre-amp 12, a braking signal generating unit 31, a driver 14, and a switch 15. The pre-amp 12 is coupled to the pick up head 11, and generates a focusing error signal. The braking signal generating unit 31 receives the focusing error signal, and generates a corresponding non-fixed braking signal. The driver 14 is coupled to the braking signal generating unit 31 via the switch 15, and according to the non-fixed braking signal, generates a corresponding driving force for controlling the pick up head 11 to perform the layer jump braking process.

Before the layer jump process is performed, the switch 15 is shifted to the upper node of FIG. 3 to perform closed-loop focusing control. When receiving a layer jump control signal, the switch 15 is turned to the lower node of FIG. 3, and the layer jump process is then performed. A kicking signal, a holding signal, and a braking signal are in turn inputted to the driver 14, and the driver 14 outputs a corresponding driving force to control the pick up head 11 to perform the corresponding process. In the preferred embodiment of FIG. 3, the magnitude of the braking signal generated by the braking signal generating unit 31 is not a fixed value.

In one embodiment, the braking signal generating unit 31 generates the braking signal by:

(1) calculating a slope of the focusing error signal;

(2) taking the absolute value of the slope;

(3) subtracting a maximum (denoted as max) of the slope from the absolute value of the slope; and (4) multiplying the difference of (3) by a gain to obtain a braking voltage.

FIG. 4 is a diagram showing the above generation process of the braking voltage. The maximum of the slope in (3) occurs when the focusing error signal just enters the "half S" section, as shown in FIG. 4. The gain used in (4) is determined according to the allowable input range of the driver 14, thereby adjusting the braking voltage to ensure normal operation of the driver 14.

In the embodiment of FIG. 4, the braking signal generating unit 31 begins to generate the braking voltage after the focusing error signal passes a braking start point, and stops generating the braking voltage after the focusing error signal passes a braking end point. When the braking signal generating unit 31 stops generating the braking voltage, the switch 15 would be shifted to the upper node of FIG. 3, and the closed-loop focusing control is then restored. The location of the braking start point is determined according to a comparison between the slope of the focusing error signal and a threshold. More specifically, there is remarkable slope variation when the focusing error signal enters the "half S" section. Therefore, the comparison can be made between the magnitude of the slope and the threshold to determine whether the focusing error signal enters the "half S" section. If the comparison shows that the slope magnitude is greater than the threshold, then the braking signal generating unit 31 begins to generate the braking voltage to perform the layer jump braking process. The location of the braking end point is selected to be behind the location with a value of max/2 in the latter half of the half S section. When the layer jump speed is larger, this kind of selection can prevent the braking process from finishing too soon and also prevent the laser spot of the pick head 11 from exceeding the focusing linear region of the target layer, thereby avoiding the layer jump failure.

The embodiment of FIG. 4 describes the case of jumping from one layer (e.g. layer 0) to another layer (e.g. layer 1). In the case of jumping from layer 1 to layer 0, the required braking voltage is generated in the same way as the embodiment of FIG. 4, except the obtained braking voltage of (4) needs to be reversed.

FIG. 5A and FIG. 5B are diagrams showing the relation between the focusing error signal and the generated braking signal at different layer jump speeds in the embodiment of FIG. 4. FIG. 5A shows the case with a faster layer jump speed, and thus the half S section of the focusing error signal is narrower and the corresponding braking signal is steeper. FIG. 5B shows the case with a slower layer jump speed, and thus the half S section of the focusing error signal is wider and the corresponding braking signal is smoother.

Figure 6:
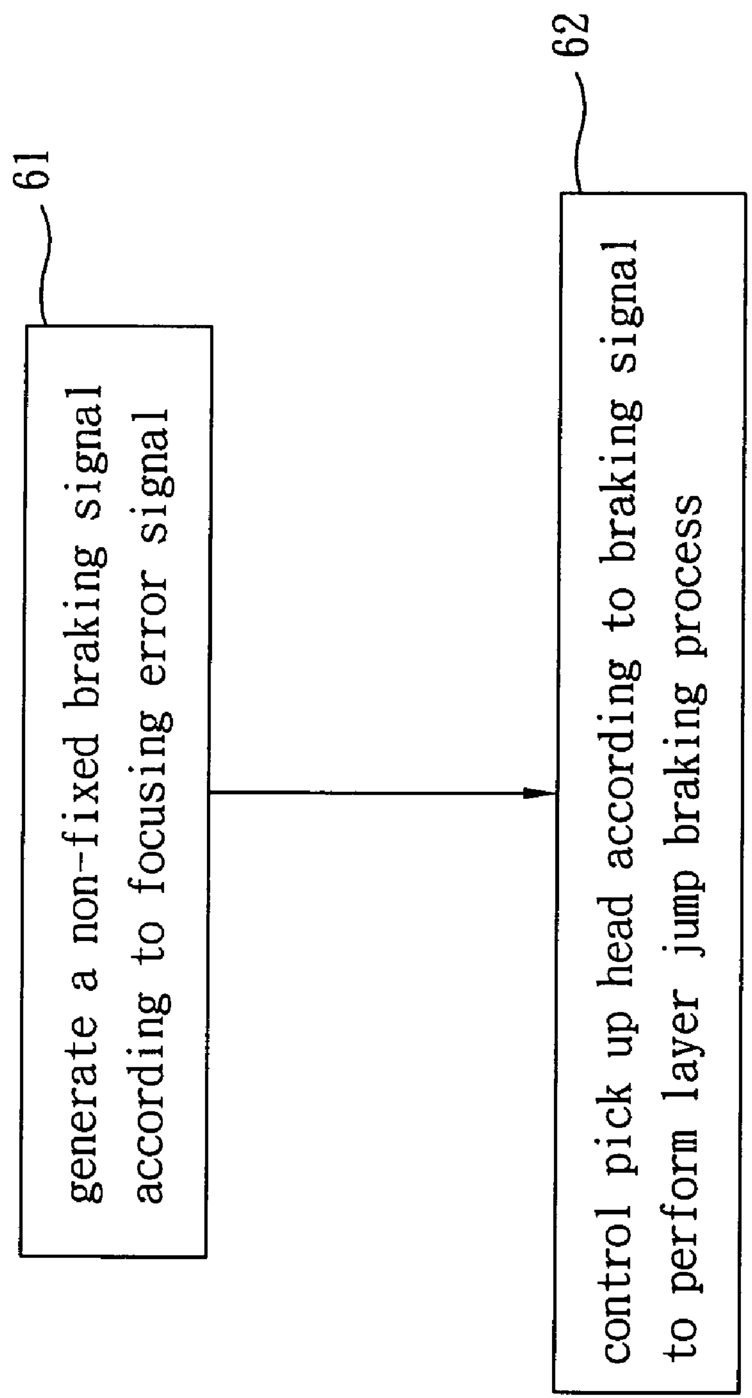
FIG. 6 is a flow chart of a preferred embodiment of the method for layer jump braking control according to the present invention.

FIG. 6 is a flow chart of a preferred embodiment of the method for layer jump braking control according to the present invention. The flow of FIG. 6 is applied to the architecture of FIG. 3 to perform a layer jump braking process. As shown in FIG. 6, the flow comprises the steps of:

61 generating a non-fixed braking signal according to the focusing error signal; and

62 controlling the pick up head 11 according to the braking signal to perform the layer jump braking process.

In one embodiment, in the step 61, the braking signal is generated in the same way as FIG. 4. In the step 62, the start point and end point of the braking process is also selected according to the embodiment of FIG. 4.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A method for controlling a layer jump process of an optical drive, the optical drive comprising a pick up head, which performs the layer jump process on an optical disk with at least two layers, the method comprising:

generating a braking signal according to a focusing error signal, wherein a magnitude of the braking signal is not constant in the duration of a layer jump braking process; and controlling the pick up head according to the braking signal to perform the layer jump braking process.

2. The method of claim 1, wherein the optical disk is a DVD disk.

3. The method of claim 1, wherein the braking signal is a voltage signal.

4. The method of claim 1, wherein the magnitude of the braking signal corresponds to variation of the focusing error signal.

5. The method of claim 4, wherein the braking signal is generated according to a slope of the focusing error signal.

6. The method of claim 5, wherein the braking signal is generated by taking an absolute value of the slope and subtracting a maximum of the slope from the absolute value of the slope.

7. The method of claim 1, wherein the braking signal is generated after the focusing error signal passes a braking start point.

8. The method of claim 7, wherein the braking start point is determined according to a comparison between a slope of the focusing error signal and a threshold.

9. The method of claim 1, further comprising:

entering closed-loop focusing control after the focusing error signal passes a braking end point.

10. The method of claim 9, wherein the braking end point is located behind a location with one half of a polar value of the focusing error signal.

11. An apparatus for controlling a layer jump process of an optical drive, the optical drive comprising a pick up head, which performs the layer jump process on an optical disk with at least two layers, the apparatus comprising:

an amplifier, coupled to the pick up head, to generate a focusing error signal;

a braking signal generating unit, coupled to the amplifier, to generate a braking signal according to the focusing error signal, wherein a magnitude of the braking signal is not constant in the duration of a layer jump braking process; and a driver, coupled to the braking signal generating unit and the pick up head, to control the pick up head according to the braking signal to perform the layer jump braking process.

12. The apparatus of claim 11, wherein the optical disk is a DVD disk.

13. The apparatus of claim 11, wherein the braking signal is a voltage signal.

14. The apparatus of claim 11, wherein the magnitude of the braking signal corresponds to variation of the focusing error signal.

15. The apparatus of claim 14, wherein the braking signal generating unit generates the braking signal according to a slope of the focusing error signal.

16. The apparatus of claim 15, wherein the braking signal generating unit generates the braking signal by taking an absolute value of the slope and subtracting a maximum of the slope from the absolute value of the slope.

17. An optical drive for performing a layer jump braking process comprising:

a pick up head to perform a layer jump process on an optical disk with at least two layers;

an amplifier, coupled to the pick up head, to generate a focusing error signal;

a braking signal generating unit, coupled to the amplifier, to generate a braking signal according to the focusing error signal, wherein a magnitude of the braking signal is not constant in the duration of the layer jump braking process; and a driver, coupled to the braking signal generating unit and the pick up head, to control the pick up head according to the braking signal to perform the layer jump braking process.

18. The optical drive of claim 17, wherein the optical disk is a DVD disk.

19. The optical drive of claim 17, wherein the magnitude of the braking signal corresponds to variation of the focusing error signal.

20. The optical drive of claim 19, wherein the braking signal generating unit generates the braking signal according to a slope of the focusing error signal.

21. The optical drive of claim 20, wherein the braking signal generating unit generates the braking signal by taking an absolute value of the slope and subtracting a maximum of the slope from the absolute value of the slope.

* * * * *